United States Patent
Gunluk

(10) Patent No.: US 8,000,250 B1
(45) Date of Patent: *Aug. 16, 2011

(54) METHOD FOR ROUTING OPTICAL SIGNALS WITH DIVERSITY REQUIREMENTS

(75) Inventor: Oktay Necip Gunluk, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1400 days.

This patent is subject to a terminal disclaimer.

(21) Appl. No.: 11/235,896

(22) Filed: Sep. 27, 2005

Related U.S. Application Data

(63) Continuation of application No. 09/993,592, filed on Nov. 6, 2001, now Pat. No. 7,023,806.

(51) Int. Cl.
*G08C 15/00* (2006.01)
(52) U.S. Cl. ......... 370/238; 370/351; 370/235; 370/254
(58) Field of Classification Search ........................ None
See application file for complete search history.

(56) References Cited

U.S. PATENT DOCUMENTS

| 6,842,463 | B1 * | 1/2005 | Drwiega et al. | 370/468 |
|---|---|---|---|---|
| 7,058,296 | B2 * | 6/2006 | Saniee et al. | 398/3 |
| 7,280,526 | B2 * | 10/2007 | Fleischer et al. | 370/351 |
| 2002/0036988 | A1 * | 3/2002 | Cardwell et al. | 370/238 |
| 2002/0181393 | A1 * | 12/2002 | Grover et al. | 370/225 |
| 2003/0099014 | A1 * | 5/2003 | Egner et al. | 359/124 |
| 2005/0108241 | A1 * | 5/2005 | Depura et al. | 707/10 |

* cited by examiner

*Primary Examiner* — Kwang B Yao
*Assistant Examiner* — Nguyen Ngo

(57) ABSTRACT

The present invention discloses a method of determining a route for transmitting a signal through a network. The method comprises obtaining and storing network and demand data. The demand data is processed using a shortest path routing method to obtain an initial route and the network data is updated accordingly. An initial cost based on the initial route is computed. The initial route is returned to the network and the network data is again updated with regard to increasing spare capacity. The demand data is re-processed using a constrained diverse shortest path routing method to obtain a final route until a stop criterion is satisfied. A final cost based on the final route is computed.

6 Claims, 3 Drawing Sheets

METHOD FOR ROUTING OPTICAL SIGNALS WITH DIVERSITY REQUIREMENTS

CROSS REFERENCE TO RELATED APPLICATIONS

This application is a continuation and claims the benefit of U.S. application Ser. No. 09/993,592, filed on Nov. 6, 2001 now U.S. Pat. No. 7,023,806.

BACKGROUND OF THE INVENTION

This invention relates generally to the field of telecommunications and routing signals over optical fibers. More particularly, this invention relates to the effective routing of multiple optical signals having diversity requirements from one or more other optical signals.

Optical networks are designed to transmit signals, such as voice and/or data signals, over fiber optic cables from one point to another. The optical networks include multiple optical transport systems (OTSs) and terminal offices. Each OTS includes fiber optic cables connecting two end terminals, such as dense wavelength division multiplexing units (DWDMUs), also referred to as termination points or nodes. Each OTS may also include other electronic devices such as optical amplifiers.

An optical network typically includes equipment provided by different vendors. Synchronous optical network (SONET) defines an optical interface standard that enables the compatability of transmission products from various vendors. The interface standard governs rates and protocols for successful signal transmission, such as optical lines rates, also known as optical carrier (OCn) rates, frame format, and operations, administration, maintenance and provisioning protocols.

Over the past decade, many telecommunication companies have been utilizing SONET rings in their networks. SONET rings connect the optical transport systems in a ring. Typically four or five nodes are connected to each SONET ring, although a different number of nodes could be used. The SONET ring architecture uses, at a minimum, a four-wire arrangement. Two of the fibers are referred to as service fibers and are uni-directionally oriented in opposite directions from one another. In other words, a first service fiber is used for transmitting a signal from point A to point B and a second service fiber is used for transmitting a signal from point B to point A. The remaining two fibers are referred to as protection fibers. The protection fibers are oriented in the same fashion as the service fibers. SONET rings are typically built with "smart" devices such that if the fibers on part of the ring are no longer capable of transmitting signals, the signals are transferred to functional fibers located on a different section of the ring for transmission.

Current data transmissions can have less stringent restoration requirements than voice transmissions. In the past, for voice applications, telecommunication networks used both service and protection fibers to minimize noticeable transmission delay. For data applications, some transmission delay is often acceptable to the users. For example, if a network is being used to transmit an electronic message from one user to another, a delay for restoration of the network might not be objectionable to users, as it would be in voice transmission. For data applications, users might be willing to obtain "unprotected" service from a telecommunications company at a reduced cost in comparison to "protected" service.

However, data transmissions may have more stringent diversity requirements than voice transmissions. Users, such as Internet Service Providers (ISPs), will often require the transmission of signals over a great distance, such as across the United States. Given that users will accept some delay in data transmission, to improve the likelihood of a successful transmission, a user might require multiple transmission routes so that if one route has a link that is down, signals may then be transmitted over a different route. However, it is possible that multiple transmission routes have some fiber spans in common. If all the transmission routes share common fibers that fail, then all of the transmission routes will go down. To avoid this occurrence, a user might request that the transmission routes be diverse from one another; that is, that the routes do not share common fiber spans.

In addition to the need for diversity, there is also a need for sufficient capacity. As traffic, i.e., the amount of signals being transmitted through a network increases, there exists a need to increase capacity to accommodate the increased traffic, or to re-route the traffic to less congested routes.

Given the foregoing, there is a need for identifying transmission routes that satisfy the diversity and capacity requirements of the users.

BRIEF SUMMARY OF THE INVENTION

The present invention solves the above and other problems by providing a system and method for routing signals over an optical network while satisfying diversity requirements and other network constraints.

The present invention discloses a method of determining a route for transmitting signals through a network. The method comprises obtaining and storing network and demand data. Network data may include, for example, link type data, spare capacity data, vendor data, and common mileage data. Demand data may include, for example, origination node data, termination node data, and diversity requirement data. The demand data is then processed using a shortest path routing method to obtain an initial route and the network data is updated. An initial cost based on the initial route is computed.

The network data is again updated with regard to increasing spare capacity by canceling the initial route. The demand data is re-processed using a constrained diverse shortest path routing method to obtain a final route until a stop criterion is satisfied. A final cost based on the final route is computed. The final route and the final cost are output.

BRIEF DESCRIPTION OF THE DRAWING

The present invention will be more fully understood by reading the following detailed description in conjunction with the drawing, in which.

DETAILED DESCRIPTION OF THE INVENTION

The present invention provides a system and method for identifying transmission routes given demands that satisfy diversity and other requirements. The present invention requires information about the physical network and about a user's routing demands to determine an appropriate transmission route.

Figure 1:
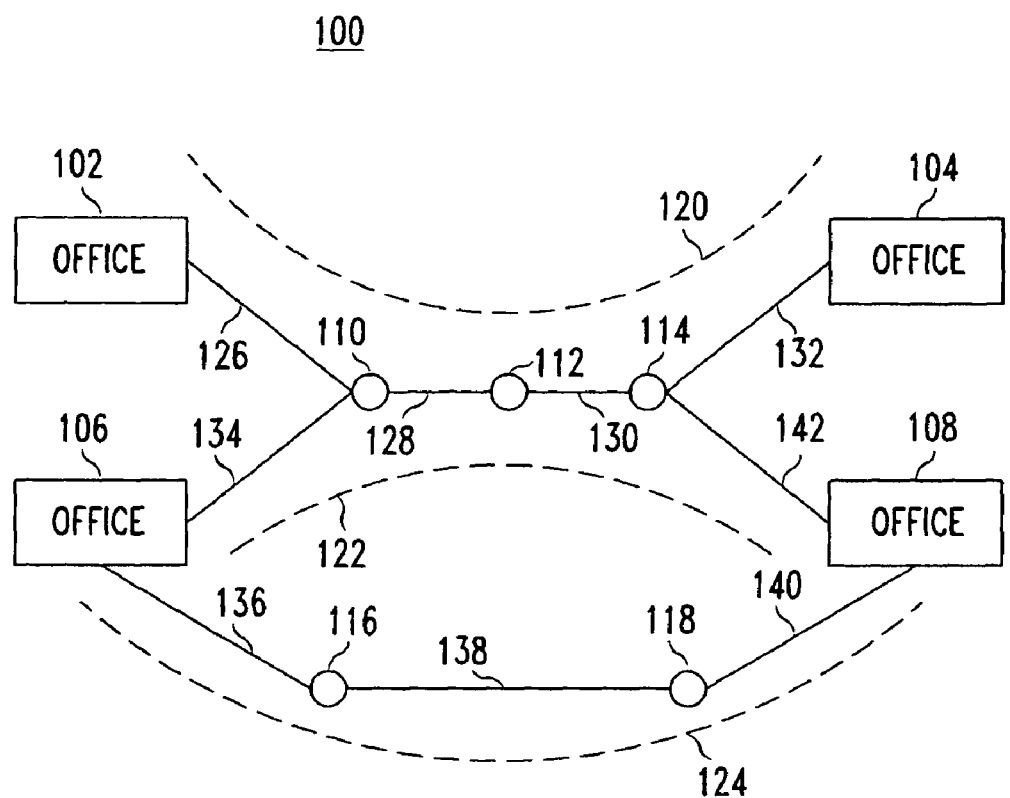
FIG. 1 is a block diagram illustrating an exemplary network having fiber optic transmission routes.

FIG. 1 shows an exemplary optical network 100. Network 100 includes offices 102-108, nodes 110-118, and links, or cross-sections 126-142. Links 126-142 are fiber optical cables. Within optical network 100, exists multiple optical transport systems (OTSs), with each office representing a termination point of an optical transport system. FIG. 1 depicts three exemplary optical transport systems riding on the fiber optic cables. A first OTS is represented by dotted-line 120. OTS 120 includes offices 102 and 104, nodes 110-114 and links 126-132. OTS 122 includes offices 106 and 108, nodes 110-114, and links 134, 128, 130 and 142. OTS 124 includes offices 106 and 108, nodes 116 and 118, and links 136-140.

FIG. 1 illustrates the concept of diversity discussed above. Different OTSs can share common fiber links. For example, OTS 120 and OTS 122 share common links 128 and 130. Thus, OTS 120 and OTS 122 are not diverse from one another. However, OTS 124 does not share any common links with either OTS 120 or OTS 122. Thus, OTS 124 is diverse from both OTS 120 and OTS 122.

To determine the transmission route for a given signal, both input demand data and input network data are required. Demand data refers to one or more requests provided by a user. Each user provides a list of demands, or connection requests, $T=\{T_1, T_2, \ldots, T_n\}$ and two transmission end points (origination and termination), $A_i$ and $Z_i$, for each demand $T_i$. The user also identifies a diversity set $D_i=\{D_i^1, D_i^2, \ldots, D_i^k\}$, for each demand, $T_i$, specifying the other demands from which $T_i$ should be diverse. This allows the user to request that certain unprotected transmission routes take physically distinct routes, in part or in whole, from one or more of the other transmission routes. In the event that that one transmission route is down for some reason, signals will be able to be transmitted over an alternate route.

$D_i$ is a subset of the list of demands T. The diversity data exhibits symmetry in that if $T_j$ is an element of the diversity set $D_i$, then $T_i$ is an element of the diversity set $D_j$. In other words, if a first demand is required to be diverse from a second demand, than the second demand must also be required to be diverse from the first demand.

In addition to the demands and the diversity requirements, a service date is also an input. This date corresponds to the date by which the user requires that the transmission routes be available to the user for signal transmission. A termination date may also be provided, which specifies the date a particular route is no longer required.

Finally, an optional demand data input is a project integrity flag. Certain fiber optic cable connections may already exist in a network. When routing new demands, it is beneficial to use such available existing fiber optic cables. A project integrity flag reflects keeping the integrity of the already established connection. In other words, if project integrity is required for a demand, then the corresponding route would not contain parts of a project. Rather, the route either includes a complete project used end-to-end or no project at all. If project integrity is not required, the route can include one or more parts of an existing project.

In addition to the demand data, network data is also an input for the present invention. The network data includes the physical network characteristics, i.e., the links, the spare capacity of the links, common fiber-span mileage for all pairs of links, vendor equipment information, and the availability date of the capacity.

Different types of links can exist within a network, including simple links, regen links, project links and future links. Simple links are optical transport systems described above. Regen links are concatenated OTSs. Project links are existing routes within a network. Future links are planned OTSs. In determining a route, it is necessary to know what types of links are located where within the network as different costs may be assigned to different types of links.

Network data includes the spare capacity of every link. Each fiber has a maximum capacity of different signals that can be simultaneously transmitted over it. A fiber, for example, can carry 80, 160, or more different signals. Multiple signals are simultaneously transmitted over the fiber by assigning different wavelengths to different signals. In other terminology, it can be said that each wavelength carries one OCn signal, where n refers to the capacity of the optical connection. For example, OC-1 (optical carrier level 1) is a SONET channel of 51.840 million bits per second. OC-192 (optical carrier level 192) is a SONET channel of 9.953 thousand million bits per second (Gbps), i.e., 192 multiplied by 51.840 million bits per second.

Spare capacity data can be collected in the form of a time horizon that is divided into a number of time periods, where spare capacity is assumed to be constant within a time period. Spare capacity for a time period includes embedded spare capacity, planned OTS capacity and disconnects of existing signal transmissions, where the capacity becomes available before the time period. Embedded spare capacity is the total available capacity in the first time period.

Network data also includes equipment vendor information for each type of link. This information includes the manufacture and release information of the equipment being used. Offices 102-108 may include optical transponder or optical translator ("OT") devices. These OT devices introduce noise into a signal and must be monitored when determining a route to limit signal distortion. More specifically, when optical transport systems are connected in series to provide for long haul signal transmissions, optical signals need to be manipulated when being transmitted from one system to another. The manipulation occurs via an OT device that shifts the wavelength of the transmitted signal as the signal moves from one optical transport system to another. The manipulation is necessary because between offices, optical signals are assigned to one of the vendor specific wavelengths that are not necessarily compatible with the wavelengths used within an office. The OT device makes the necessary adjustments to the optical signal, to keep the content of the signal accurate. Optical transponder devices, in manipulating the optical signal, introduce a jitter noise which accumulates as a signal is being transmitted. This noise needs to be monitored such that the noise does not exceed a threshold value. The amount of noise introduced depends on the particular vendor and the release of the OT device.

When determining a route, the number of OT devices should be minimized, to minimize the corresponding noise. This concept that a route is limited by noise contributed by OT devices is referred to herein as the OT constraint. To determine if a given route is feasible with respect to the OT constraint, the total number of OT devices for each vender and each release along the route must be counted.

The following general formula can be applied to determine if a route is feasible:

$$\Sigma_{k \in K} n_k / \max_k \leq 1 \qquad \text{(Eq. 1)}$$

where $n_k$ denotes the cumulative total count of OT devices along a path k∈K, K denotes the set of possible vendor/release combinations and $\max_k$ is a parameter specified for each k∈K.

When an optical signal is transmitted between two OTSs within an office, it is typically necessary to use OT devices for both OTSs, e.g., a receive side OT device and a transmit side OT device. If both OTSs belong to the same vendor, however, it might be possible to omit one of the OT devices when calculating the OT constraint.

The network data further includes common fiber-span mileage for all pairs of links. Because diversity of routes is a concern, it is important to know what fiber routes are being used in each connection. One way to present this information is to construct a matrix that would display the common fiber-span mileage for every pair of links. This information can be presented in matrix form.

For example, with reference to FIG. 1, a suitable common fiber-span mileage matrix might be as follows:

| COMMON FIBER-SPAN MILEAGE MATRIX | | | |
|---|---|---|---|
| | OTS 120 | OTS 122 | OTS 124 |
| OTS 120 | X | 50 Miles * | 0 Miles |
| OTS 122 | 50 Miles * | X | 0 Miles |
| OTS 124 | 0 Miles | 0 Miles | X |

* assuming that mileage between nodes 110 and 114 is 50 miles.

With the demand and network data, the present invention determines one optimal route, or solution, for each demand. One suitable way to model a solution for a given demand is to base the solution upon total diversity violation, total capacity violation (total overload), and total routing cost.

More specifically, the present invention outputs a route $R_i$ for each demand $T_i$, together with some detailed and aggregated information regarding the solution. Such information includes the cost of the route $R_i$. The total cost of a solution $R=\{R_1, R_2, R_3, \ldots R_n\}$ having multiple demands $T=\{T_1, T_2, T_3, \ldots T_n\}$ is expressed as follows:

$$\text{Total\_Cost}(R) = \text{Div\_Cost}(R) + \text{Overload\_Cost}(R) + \text{Routing\_Cost}(R) \quad \text{(Eq. 2)}$$

The first term relates to the cost associated with violating diversity requirements. The following matrices show the diversity requirements and the violations of those requirements respectively. The diversity requirements may be presented in a square matrix as follows:

| DIVERSITY REQUIREMENTS MATRIX | | | |
|---|---|---|---|
| | D1 | D2 | D3 | D4 |
| D1 | X | 0 | 1 | 1 |
| D2 | 0 | X | 0 | 1 |
| D3 | 1 | 0 | X | 0 |
| D4 | 1 | 1 | 0 | X |

A "1" indicates that the two routes, corresponding to the two demands, should be diverse from one another. A "0" indicates that diversity is not required for those two demands. For example, the above matrix indicates that the route selected to satisfy demand D1 should be diverse from the routes selected to satisfy D3 and D4, but not necessarily D2. In addition, the route selected to satisfy demand D2 should be diverse from the route selected to satisfy D4, but not necessarily D1 or D3.

The total diversity violation count is the sum of pair-wise diversity requirements which have been violated.

| DIVERSITY VIOLATION COUNT MATRIX | | | |
|---|---|---|---|
| | D1 | D2 | D3 | D4 |
| D1 | X | 0 | 1 | 0 |
| D2 | 0 | X | 0 | 1 |
| D3 | 1 | 0 | X | 0 |
| D4 | 0 | 1 | 0 | X |

The above diversity violation count matrix contains information on whether a diversity requirement was satisfied. A "1" indicates that there is a diversity requirement between the two demands and the requirement is violated. A "0" indicates either that diversity is not required between those two demands or, if diversity is required, that the requirement is not violated. In the above diversity violation count matrix, it is shown for example, that D1 and D3 and D2 and D4 have diversity requirements that have been violated once. There is a diversity requirement between demands D1 and D4, but because it is not violated a "0" is shown in the matrix. There are no diversity requirements between demands D1 and D2, D2 and D3, and D3 and D4, so "0"'s are shown in the matrix. The total diversity violation count is an integer equal to the total number of diversity requirements that were not satisfied.

Returning to Eq. 2, the term Div_Cost may be defined as follows:

$$\text{Div\_Cost}(R) = \alpha_{div\_count} \times \text{Div\_Count}(R) + \alpha_{div\_miles} \times \text{Div\_Mileage}(R) \quad \text{(Eq. 3)}$$

where Div_Count(R), described above in Paragraphs 35 and 36, is the total number of pair-wise diversity violations, Div_Mileage(R) is the total violation fiber mileage, and the parameters $\alpha_{div\_count}$ and $\alpha_{div\_miles}$ weight the terms Div_Count(R) and Div_Mileage(R) respectively, representing the relative importance of the cost components. For example, if a particular user does not rate satisfying the diversity requirements as important, one or both of the $\alpha_{div\_count}$ and $\alpha_{div\_miles}$ parameters can be set to zero, causing those terms to be removed from Eq. 3.

Div_Count(R) and Div_Mileage(R) can be defined more specifically as follows.

$$\text{Div\_Count}(R) = \frac{1}{2} \sum_{T_i \in T} \sum_{T_j \in D_i} 1_{\{Common\_miles(R_i, R_j) > max\_allowed\}} \quad \text{(Eq. 4)}$$

$$\text{Div\_Mileage}(R) = \frac{1}{2} \sum_{T_i \in T} \sum_{T_j \in D_i} Common\_miles(R_i, R_j) \quad \text{(Eq. 5)}$$

where, Common_miles($R_i$, $R_j$) measures the common fiber-span mileage of routes i and j. As noted in Eq. 4, two routes are considered violating the diversity constraint only if the common fiber-span mileage is more than the parameter max allowed. Max allowed can be set equal to zero, or to a positive value, e.g., five or ten miles. This parameter provides flexibility in the cost function to ignore short diversity violations. This may be necessary when all fiber cables entering an office follow the same physical path for the last few miles.

The common mileage of two routes can be computed using the common fiber-span mileage matrix of paragraph 30, Common_Span as follows:

$$\text{Common\_miles}(R_i, R_j) = \sum_{e_k \in R_i} \sum_{e_l \in R_j} \text{Common\_Span}[e_k, e_l] \quad \text{(Eq. 6)}$$

The second element in the Total_Cost equation (Eq. 2) is the Overload_Cost. In general, the overload cost is the weighted sum of individual link capacity violations. When multiple routes are combined together, the routes can overload certain links. Capacity violations can vary depending on the type of link. For example, overloading a future link may be penalized (weighted) more than overloading a simple or regen link. Some links, like project links, may not be overloaded at all. Alternatively, using planned capacity before it becomes available may be preferable to overloading a link that has no expansion plans.

The Overload_Cost is the penalty added to the Total_Cost for not complying with capacity availability. The Overload_Cost of route R is the weighted sum of capacity violations per period and may be defined as follows:

$$\text{Overload\_Cost}(R) = \quad \text{(Eq. 7)}$$
$$\alpha_{overload} \times \sum_{e \in E} \sum_{p \in P} \beta_e \max\{0, \text{load}(e, p) - \text{cap}(e, p)\}$$

where $\alpha_{overload}$ is a parameter denoting the relative importance of the capacity violation, cap(e, p) denotes the total spare capacity of the link e∈E in period p∈P and load(e, p) denotes the total load on the same link in that period after routing has been completed. $\beta_e$ is a parameter denoting the relative importance of the link. $\beta_e$ can weight each type of link, e.g., simple, regen, project or future, differently. For example, $\beta_e$ could be very large for project links, ensuring that these links would not be overloaded, but relatively small for simple links, permitting for some overloading. New terms can be added to promote or penalize early usage of spare capacity.

The final element in the Total_Cost equation (Eq. 2) is the Routing_Cost. The Routing_Cost is based on the mileage of a route and the number of OTSs used in the route. The routing cost is the sum of individual route costs as follows:

$$\text{Routing\_Cost}(R) = \alpha_{route} \times \sum_{R_i \in R} \sum_{e \in R_i} \text{Link\_Cost}(e) \quad \text{(Eq. 8)}$$

where $\alpha_{route}$ is a parameter that denotes the relative importance of the routing cost in determining the overall cost of a route solution. For each link, there is a Link_Cost which equals a constant plus the mileage of the link. The Link_Cost may be further defined as follows:

$$\text{Link\_Cost}(e) = \begin{cases} 1 + \alpha_{route\_miles} \times \text{Mileage}(e) & \\ \quad : \text{if } e \text{ is a simple link} & \\ \alpha_{proj}(\text{No\_of\_DWDMU\_CrossSections} + & \\ \quad \alpha_{route\_miles} \times \text{Mileage}(e)) & \\ \quad : \text{if } e \text{ is a composite link} & \end{cases} \quad \text{(Eq. 9)}$$

where $\alpha_{route\_miles}$ is a parameter that denotes the relative importance of mileage in determining the routing cost, $\alpha_{proj}$ is a parameter that denotes a discount value, i.e., it has a value less than one, to encourage the use of existing projects and No_of_DWDMU_CrossSections is the number of dense wavelength division multiplexing unit cross sections. In other words, the Link_Cost of a project may be less than the sum of the Link_Costs of the individual simple links that it spans.

The quality of the solutions depends on how well the cost function represents user preferences. This may require experimentation and calibration of the cost parameters: $\alpha_{div\_count}$, $\alpha_{div\_miles}$, $\alpha_{overload}$, $\alpha_{routes}$, $\alpha_{proj}$, and $\alpha_{route\_miles}$ for a particular application.

In an exemplary embodiment, demands are processed one at a time as follows. A first demand is routed using a shortest path method. The next demand is then routed, and so forth. Demands are routed without changing routes of demands previously routed and without taking into account other outstanding demands to be routed. Once all the demands are routed, an initial routing solution, including an initial total cost, are obtainable, as described above.

To potentially obtain a better cost, the demands are individually re-routed in an attempt to reduce the total cost of the initial solution. In this specialized shortest path method, a pre-established route is selected and re-routed, while the other routes remain fixed. A next route is then selected and rerouted in a similar fashion. This process is repeated with the remaining routes to improve the total cost of the solution. The duration of the method may be limited by time, by a preset number of iterations, such as a multiple of the number of demands, cost improvement, or by some other stop criteria.

Figure 2:
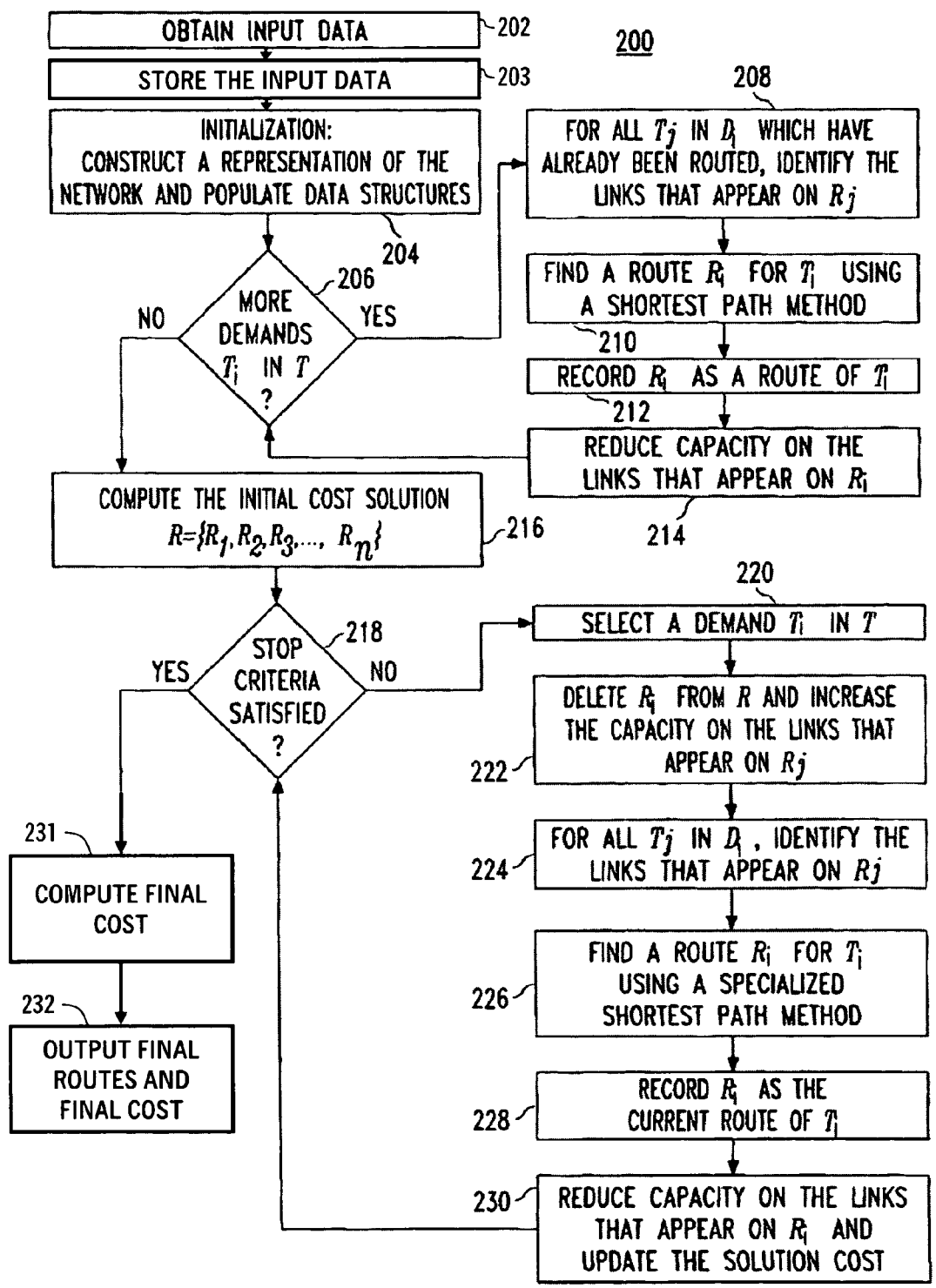
FIG. 2 is a flow chart of a method for routing demands in accordance with the present invention.

FIG. 2 is a flow chart of a method 200 for routing demands in accordance with the present invention. Method 200 begins with obtaining the input demand and network data described above (step 202), and storing that data (step 203). The network data described above is processed to construct a representation of the network and relevant data structures are populated (step 204). Demands T are then individually routed (decision 206). If a demand $T_j$ has already been routed on route $R_j$ and is required to be diverse from $T_i$, i.e., $T_j$ is included in $D_i$, the links of $R_j$, should be marked or identified in some manner (step 208). Demand $T_i$ is then routed on route $R_i$ using a shortest path algorithm (step 210). Route $R_i$ is stored (step 212). The network representation originally stored in step 204 is then updated to reduce the link capacities used in route $R_i$ (step 214). This process is repeated until there are no more demands $T_i$ (decision 206). The initial cost of the solution for all demands is computed (step 216).

Until a stop criterion is satisfied (decision 218), one demand $T_i$ is selected (step 220). The route $R_i$ corresponding to demand $T_i$ is deleted from the collection of all routes R and the network representation is updated to increase the link capacities accordingly (step 222). The fiber links used for routing a demand $T_j$, required to be diverse from $T_i$, are marked or identified in some suitable manner (step 224). Demand $T_i$ is then re-routed on a new route $R_i$ using a specialized shortest path algorithm described below (step 226). New route $R_i$ is stored as the current route of demand $T_i$ (step 228). The network representation is updated to reduce the link capacities used in new route $R_i$ (step 230). Once the stop criterion is satisfied (decision 218), a final routing and total cost solution is obtainable and reported by computing a final cost (step 231) based on the final routes, and outputting the final routes and the final cost (step 232).

Figure 3:
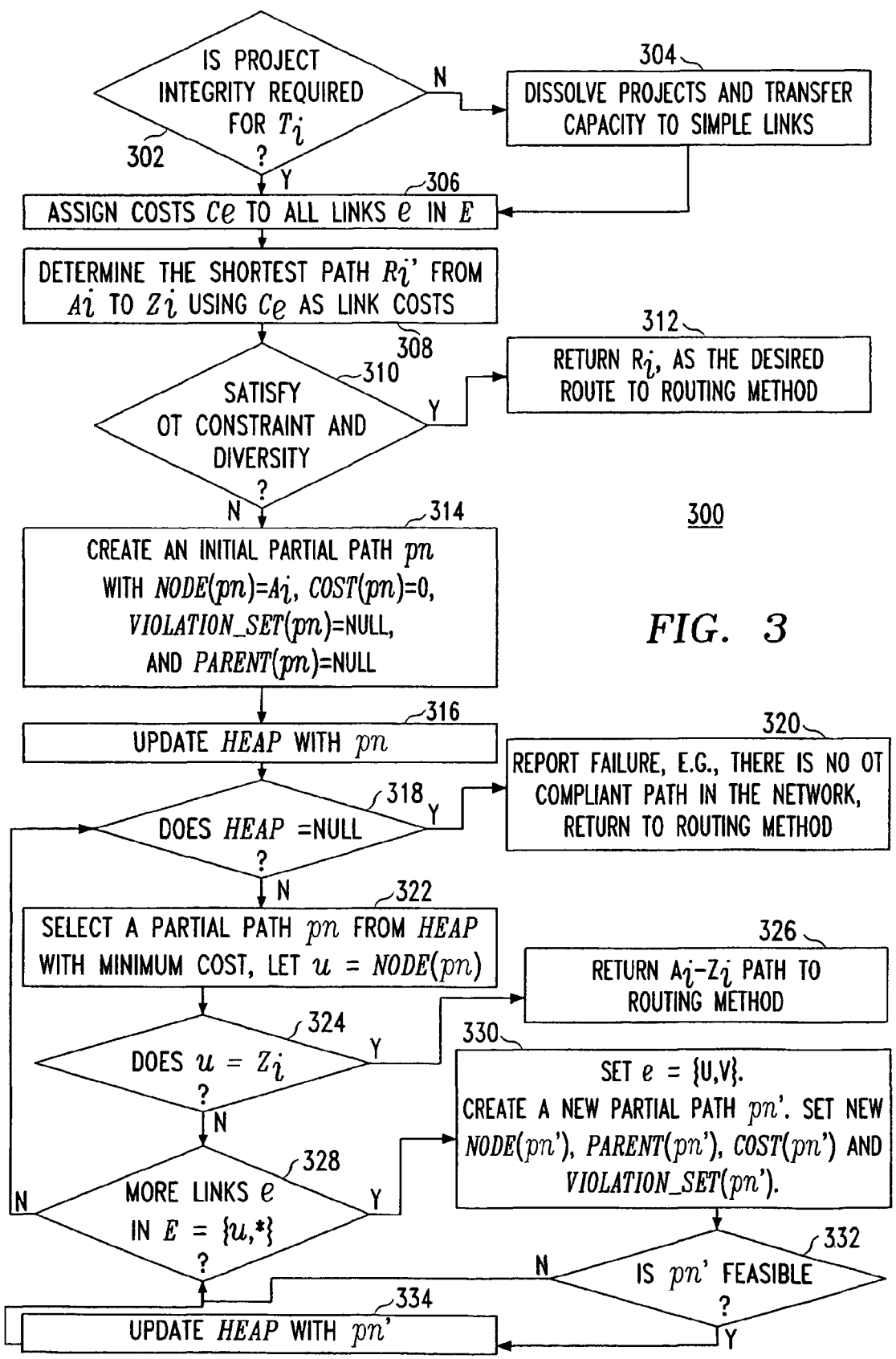
FIG. 3 is a flow chart of a shortest path algorithm used in accordance with the present invention.

A "specialized" shortest path algorithm is provided to find the shortest path for each demand $T_i$ that will increase the overall cost least, while maintaining the other routes fixed. This specialized shortest path algorithm is referred to as the Constrained Diverse Shortest Path Method (CDSPM) and is set forth in detail in FIG. 3. The CDSPM 300 first checks if project integrity is required (decision 302). If project integrity is not required, the projects can be dissolved and the network is represented with more simple link capacity (step 304). If project integrity is required, the network representation remains the same. Additive costs $c_e$ are assigned to each link e (step 306). The shortest route $R_i'$ from origination node $A_i$ to termination node $Z_i$ is determined using a known shortest path algorithm to route demand $T_i$ (step 308). Once route $R_i'$ is established, the diversity requirements and OT constraints are checked to see if route $R_i'$ violates them (decision 310). If route $R_i'$ does not violate them, then the route is acceptable and is provided to the routing method of FIG. 2, e.g., at step 226 (step 312). CDSPM is complete.

However, modifications of route $R_i'$ maybe necessary to comply with the diversity requirements and/or the OT constraints. If route $R_i'$ does violate the diversity requirements and/or the OT constraints, CDSPM continues by creating a series of partial paths until a complete path to $Z_i$ is determined or until a stopping criteria is satisfied. CDSPM begins by creating an initial partial path pn (step 314). Initial partial path pn has node, cost, violation_set and parent parameters. Node (pn) is the last node, or the termination node of a previous partial path and is set equal to $A_i$, the originating node of route $R_i'$ because this is the initial partial path. Cost(pn) measures the total cost of the partial path so far, and is set equal to zero, again because this is the initial path, having no links yet. Violation_set(pn) is a collection of violated diversity requirements of the partial path and is set equal to null because there are no diversity violations yet. Lastly, parent(pn) is the previous partial path and is set equal to null because this is the initial path.

Initial partial path pn is supplied to Heap (step 316). Heap stores partial paths in memory and indicates whether there is remaining work to establish a route to termination node $Z_i$. When Heap equals null prior to establishing the route to termination node $Z_i$, there is no route that is compliant with the OT constraint (step 320). CDSPM returns the least incompliant route back to the routing method.

When Heap equals some value other than null, a partial path pn that has minimum costs is selected from Heap (step 322). Variable u is set equal to node(pn). If u equals $Z_i$ (decision 324), the route $A_i$-$Z_i$ corresponding to pn is returned to the routing method (step 326).

If u does not equal $Z_i$, all of the possible next nodes leading to $Z_i$ are scanned. In other words, all links adjacent to the last node of the current partial path are scanned (decision 328). For all of the links leading to the next nodes, new partial paths pn' are created (step 330).

For link e={u,v}, new partial path pn' has the following parameters:

Node(pn')=v;

Violation_Set(pn')=Violation_Set(pn)∪{$T_j∈D_i$:e∈$R_j$},

Cost(pn')=Cost(pn)+$c_e$+$\alpha_{div\_count}$×|Violation_Set(pn')\Violation_Set(pn)|, and Parent(pn')=pn.

As shown in the Violation_Set(pn) formula, the union operation shows that the total routing costs are not merely additive. If a diversity violation has already been counted, it is not recounted here. However, if a new diversity requirement is violated, it is included in this parameter. In other words, the bracketed notation states that all of the diversity violations of demand $T_i$ are reviewed in light of the current link e. If link e contains a link from which $T_i$ is required to be diverse, a diversity violation has occurred. If the violation has not already been accounted for in Violation_Set(pn), then the violation is added to Violation_Set(pn').

The new cost Cost(pn') equals the sum of the old cost Cost(pn), the additive cost $c_e$, and the change in the size of the violation set multiplied by $\alpha_{div\_count}$, a diversity count penalty parameter. If the previous path pn has already violated diversity requirements that cost is already included in the cost of the previous partial path, so only the extra violations need to be added.

The new partial path pn' is then reviewed to determine if it is feasible (step 332). A partial path pn' is considered feasible if it satisfies the OT constraint. In other words, a partial path is feasible if the cumulative jitter noise along the path from origination node $A_i$ to node(pn') plus the minimum OT jitter noise that will accumulate from node(pn') to termination node $Z_i$ is below a threshold.

If the new partial path pn' does satisfy the OT constraint, it is feasible and Heap is updated with pn' (step 334). If the new partial path pn' does not satisfy the OT constraint, the path is discarded.

If the new partial path pn' is "dominated" by some other partial path, the path is also discarded. Domination means that if a first partial path is worse in all respects than a second partial path, the first partial path is useless. The second partial path is said to "dominate" the first partial path. In other words, a partial path pn' is dominated by another path pn is all of the following conditions are true:

Node(pn')=Node(pn),Violation_Set(pn)⊆Violation_Set(pn'),

Cost(pn')≧Cost(pn), and
OT count(pn)≦OT count(pn').

In either case, a next link e is then obtained (step 328) and another partial path is produced (step 330) until there are no more links adjacent to the last node of the current partial path mentioned above.

Various modifications and adaptations of the present invention will be apparent to persons skilled in the art. For example, the present application is applicable to all suitable transmission media other than optical fibers. The present application is intended to encompass such modifications and adaptations.

The invention claimed is:

1. A method of determining routes for transmitting signals through a network, the method comprising:
   obtaining network data, including link type data, spare capacity data, vendor data, and common mileage data;
   obtaining demand data for a plurality of demands, including origination node data, termination node data, and diversity requirement data;
   storing the network data and the demand data;
   processing the demand data using a shortest path routing method to obtain an initial route for each demand, where each demand is routed without changing the route of previously routed demands and without regard to any outstanding demands to be routed;
   updating the network data by decreasing the spare capacity data in accordance with the initial route;
   computing an initial cost based on the initial routes for all demands;
   updating the network data by increasing the spare capacity data in accordance with deleting the initials routes;
   re-processing the demand data using a constrained diverse shortest path routing method by individually re-routing each demand until a stop criterion is satisfied and obtaining a final route for each demand, the constrained diverse shortest path routing method including creating a plurality of partial paths starting at an originating node of the demand, evaluating a partial path cost for each created partial path, each partial path cost including only new diversity requirement violations, selecting one of the created partial paths based on the evaluated partial path cost, and repeating, using an end node of the selected partial path as starting node, until a destination node of the demand is reached;

computing a final cost based on the final routes; and outputting the final routes and the final cost.

2. The method of claim 1, wherein the constrained shortest path routing method minimizes use of optical transponders in obtaining the final route.

3. The method of claim 1, wherein the initial cost and the final cost are based on one or more of a diversity cost, a capacity overload cost and a routing cost.

4. The method of claim 1 wherein the demand data includes project integrity data.

5. A method of determining routes for transmitting signals through a network, the method comprising:

obtaining a plurality of demands T, each demand $T_i$ having diversity requirements $D_i$;

processing each demand $T_i$ consecutively using a shortest path routing method to obtain a corresponding initial route $R_i$ which satisfies the diversity requirements $D_i$ if network parameters permit for each demand, where each demand is routed without changing the route of previously routed demands and without regard to any outstanding demands to be routed;

updating the network parameters based upon the initial routes R;

computing an initial cost solution based on the initial routes R;

re-processing each demand $T_i$ using a constrained diverse shortest path routing method to obtain a corresponding final route $R_i'$ by individually re-routing each demand until a stop criterion is satisfied, the constrained diverse shortest path routing method including creating a plurality of partial paths starting at an originating node of the demand, evaluating a partial path cost for each created partial path, each partial path cost including only new diversity requirement violations, selecting one of the created partial paths based on the evaluated partial path cost, and repeating, using an end node of the selected partial path as starting node, until a destination node of the demand is reached;

computing a final cost solution based on the final routes R'; and outputting the final routes R' and the final cost solution.

6. A method of determining routes for transmitting signals through a network, the method comprising:

obtaining a plurality of demands T, each demand $T_i$ having diversity requirements $D_i$;

processing each demand $T_i$ consecutively using a shortest path routing method to obtain a corresponding initial route $R_i$ considering the diversity requirements $D_i$ for each demand, where each demand is routed without changing the route of previously routed demands and without regard to any outstanding demands to be routed; and re-processing demands T using a constrained diverse shortest path method to obtain corresponding final routes R' by individually re-routing each demand until a stop criterion is satisfied, the constrained diverse shortest path routing method including creating a plurality of partial paths starting at an originating node of the demand, evaluating a partial path cost for each created partial path, each partial path cost including only new diversity requirement violations, selecting one of the created partial paths based on the evaluated partial path cost, and repeating, using an end node of the selected partial path as starting node, until a destination node of the demand is reached.

* * * * *